United States Patent [19]
Gruender, Jr. et al.

[11] Patent Number: 5,463,589
[45] Date of Patent: Oct. 31, 1995

[54] METHOD AND SYSTEM FOR AUTOMATIC CONFIGURATION OF MEMORY DEVICES

[75] Inventors: Eugene H. Gruender, Jr., Austin; C. W. Clark, Cedar Park; Douglas R. Kraft, Austin, all of Tex.

[73] Assignee: Motorola, Inc., Schaumburg, Ill.

[21] Appl. No.: 269,427

[22] Filed: Jun. 30, 1994

[51] Int. Cl.$^6$ .................................................. G06F 13/00
[52] U.S. Cl. .................... 365/230.01; 395/164; 395/165; 395/166; 395/405; 395/650; 395/497.01
[58] Field of Search .......................... 365/230.01, 230.02, 365/189.01; 395/164, 165, 166, 425

[56] References Cited

U.S. PATENT DOCUMENTS 5,249,270  9/1993  Stewart et al. .......................... 395/200

*Primary Examiner*—Viet Q. Nguyen
*Attorney, Agent, or Firm*—S. Kevin Pickens

[57] ABSTRACT

A method and system for automatic configuration of memory devices having a same initial address. Initially, all of the memory devices in the computer system are disabled but one enabled memory device. An initial address of the enabled memory device is changed to a new unique address. Then, unless all of the memory devices have been enabled, one previously disabled memory device is enabled to produce a next enabled memory device having the initial address. The steps of changing the initial address of the enabled memory device to a new unique address and enabling a next enabled memory device having the initial address are then repeated until the initial address of each of the memory devices has been changed to a new unique address.

9 Claims, 3 Drawing Sheets

METHOD AND SYSTEM FOR AUTOMATIC CONFIGURATION OF MEMORY DEVICES

TECHNICAL FIELD

This invention relates generally to memory devices and, more particularly, to configuration of memory devices.

BACKGROUND OF THE INVENTION

A typical computer system may employ a number of different memory devices, such as RAMs, DRAMs, etc. For example, a multiple board computer system has a motherboard connected to one or more daughterboards in a daisy chain. The motherboard includes a processor and a memory system having a memory device. Each daughterboard contains a different memory system having a different memory device. Initially, upon startup or reset of the computer system, each memory device may have a same initial address through which that memory device is accessed by the processor. Thus, conventionally, it has been necessary during installation to manually set jumpers or switches on the boards which differentiate addresses of the memory devices to the processor.

Unfortunately, setting these jumpers or switches requires the intervention of a knowledgeable computer scientist or engineer. This slows the installation process and places a demand on the computer scientist or engineer to be on site during installation. Further, the manual setting of jumpers or switches introduces the possibility of human error, which may result in the impairment or prevention of operation of the computer system. Thus, a more efficient means is needed for configuring memory devices in a multiple board computer system.

DESCRIPTION OF THE PREFERRED EMBODIMENT

In a preferred embodiment of the invention, a computer method and system are provided for automatic configuration of memory devices having a same initial address. Initially, all of the memory devices in the computer system are disabled but one enabled memory device. An initial address of the enabled memory device is changed to a new unique address. Then, unless all of the memory devices have been enabled, one previously disabled memory device is enabled to produce a next enabled memory device having the initial address. The steps of changing the initial address of the enabled memory device to a new unique address and enabling a next enabled memory device having the initial address are then repeated until the initial address of each of the memory devices has been changed to a new unique address. As a result, configuration is accomplished quickly and correctly, automatically providing each memory device with a unique address without requiring the error-prone setting of jumpers or switches.

Figure 1:
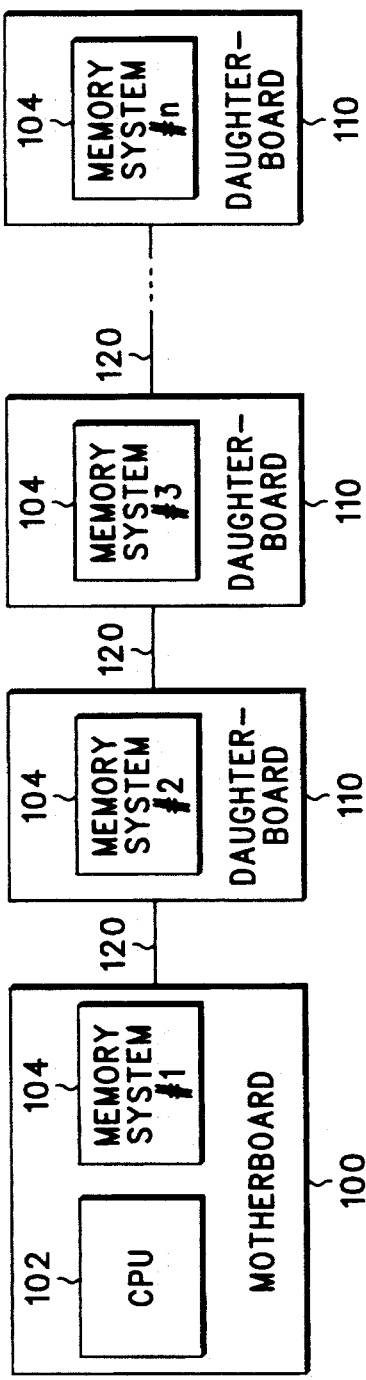
FIG. 1 is block diagram of a multiple board computer system provided in accordance with a preferred embodiment of the present invention.
Figure 2:
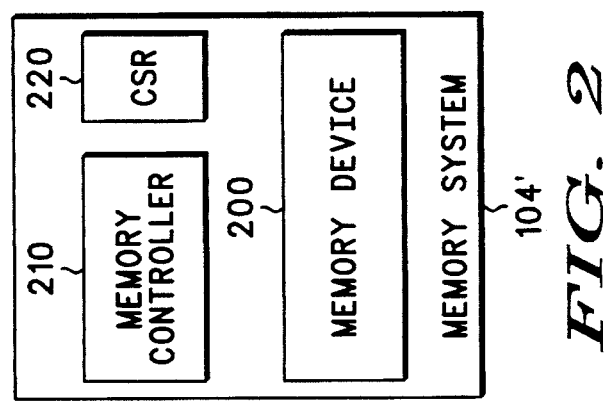
FIG. 2 is a block diagram of a memory system in the multiple board computer system of FIG. 1.

An implementation of the preferred embodiment is shown in FIGS. 1 and 2. FIG. 1 is a block diagram of a multiple block computer system provided in accordance with the preferred embodiment of the present invention. In this implementation, the multiple board computer system of FIG. 1 has multiple boards comprising a motherboard 100 and one or more daughterboards 110. The daughterboards 110 are connected to the motherboard 100 by enable/disable lines 120 in a daisy chain, as shown. The motherboard 100 includes a processor (CPU) 102 and a memory system 104. The motherboard 100 is, for example, a VME197 board, provided by Motorola, Inc. As shown in FIG. 2, which will be explained later in greater detail, the memory system 104 has a memory device 200, such as a RAM, DRAM, etc. Each daughterboard 110 includes a different memory system 104 having a different memory device 200. The daughterboard is, for example, a VME297 board, provided by Motorola, Inc.

The CPU 102 performs an initial configuration of the memory devices 200 as follows. The CPU 102 first disables all of the enable/disable lines 120 to disable and thus prevent access by the CPU 102 to all but one of the memory systems 104 (memory system #1). Thus, only the memory device 200 in the memory system 104 on the motherboard 100 (memory system #1) is enabled. The CPU 102 then changes an initial address of the enabled memory device 200 to a new, unique address. Then, the CPU 102 enables a next enable/disable line 120 to a next daughterboard 110 to enable a next enabled memory system 104 (memory system #2) and thus enable and provide access to the memory device 200 provided therein. The CPU 102 then repeats the steps of changing the initial address of the enabled memory device 200 in each memory system 104 (memory system #2, memory system #3, ... memory system #n) to a new unique address, and enabling a next enabled memory system 104 (memory system #3, ... memory system #n) in the daisy chain until the initial address of each of the memory devices 200 has been changed to a new, unique address.

Upon completing the initial configuration process described above, the addresses of all of the memory devices 200 have been changed from the same initial address to new, unique addresses. During initial configuration, it was necessary to prevent access by the CPU 102 to all but one of the memory devices 200 at the initial address at any given time. At the completion of the initial process, however, in accordance with the implementation of the preferred embodiment described herein, it is possible to access a memory device 200 even if the address of one of the memory devices 200 is changed back to the initial address. As a result, the CPU 102 can thereafter perform a reconfiguration process which includes changing the address of a memory device 200 back to the initial address.

For example, the CPU 102 may thereafter reconfigure the memory devices 200 based on size, first changing an address of a largest memory device 200 back to the initial address, then changing the address of a next largest memory device to an address contiguous to the largest memory device 200

(that is, the address just beyond the ending address of the largest memory device 200). The CPU 102 continues reconfiguration, changing the address of each next largest memory device 200 to an address contiguous to the memory device having the last changed address, until the addresses of all of the memory devices 200 have been changed. Thus, in the implementation of the preferred embodiment described above, the memory devices 200 are initially configured so as to prevent all of the memory devices 200 from being accessed at the same initial address, while at the same time allowing any of the memory devices to be moved back to the initial address during reconfiguration.

The configuration process of the above implementation of the preferred embodiment can be illustrated in detail with reference to FIGS. 2–4. As noted above, FIG. 2 is a block diagram of a memory system 104. Also as noted above, each memory system 104 has a memory device 200 such as a RAM, DRAM, etc. The memory system 104 also has a memory controller 210 which controls access to the memory device 200 by the CPU 102. The memory controller 210 maintains the address of the memory device 200 in a command status register (CSR) 220. In the specific implementation described herein, the initial address of the memory device 200 stored in the CSR 220 is 0 (zero). The initial address of the CSR itself is FFE01000h.

Figure 3:
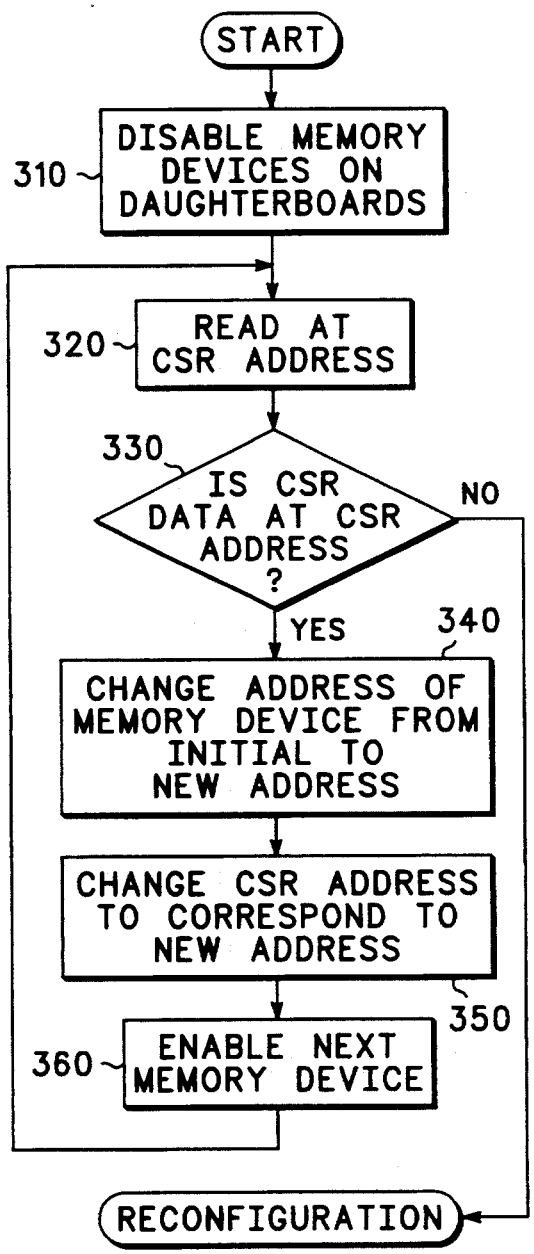
FIG. 3 is a flow diagram of the process of initial configuration performed by a preferred embodiment of the present invention.

FIG. 3 is a flow diagram of the process of initial configuration performed by the preferred embodiment of the present invention. The initial configuration process shown in FIG. 3 is performed upon startup or reset (START) of the multiple board computer system of FIG. 1 to initially configure the memory devices 200. In step 310, the CPU 102 disables the memory devices 200 on the daughterboards 110 by disabling the enable/disable lines 120, thus leaving only the memory device 200 on the motherboard 100 (memory device #1 in FIG. 1) initially enabled. In step 320, the CPU 102 reads the data at the initial CSR address (FFE01000h) via the memory controller 210. As long as the data obtained at the initial address of the CSR 220 is CSR data, which has a recognizable format indicating the address of the memory device 200, then the CPU 102 proceeds to step 340.

In step 340, the CPU 102 changes the address of the enabled memory device 200 from the initial address 0 to a new, unique address (e.g., 0100000000h for memory system #1) which will not overlap any memory device 200 having 0 as an initial address or the initial address of the CSR 220 (initially memory system #1). In step 350, the CPU 102 changes the address of the CSR 220 to correspond to the new, unique address of the memory device 200 (e.g., from FFE01000h to 01FFE01000h for memory system #1). Then, in step 360, the CPU 102 enables the next memory device 200 (memory system #2) by enabling the enable/disable line 120 to the next daughterboard 110. The CPU 102 then loops back to step 320 and 330 and repeats steps 340–360 and 320–330, (for memory system #2, memory system #3, . . . memory system #n) as long as CSR data is determined present in step 330 indicating the address of a memory device 220. Otherwise, initial configuration is complete, and the CPU 102 branches to perform reconfiguration of the memory devices 200 (RECONFIGURATION).

Figure 4:
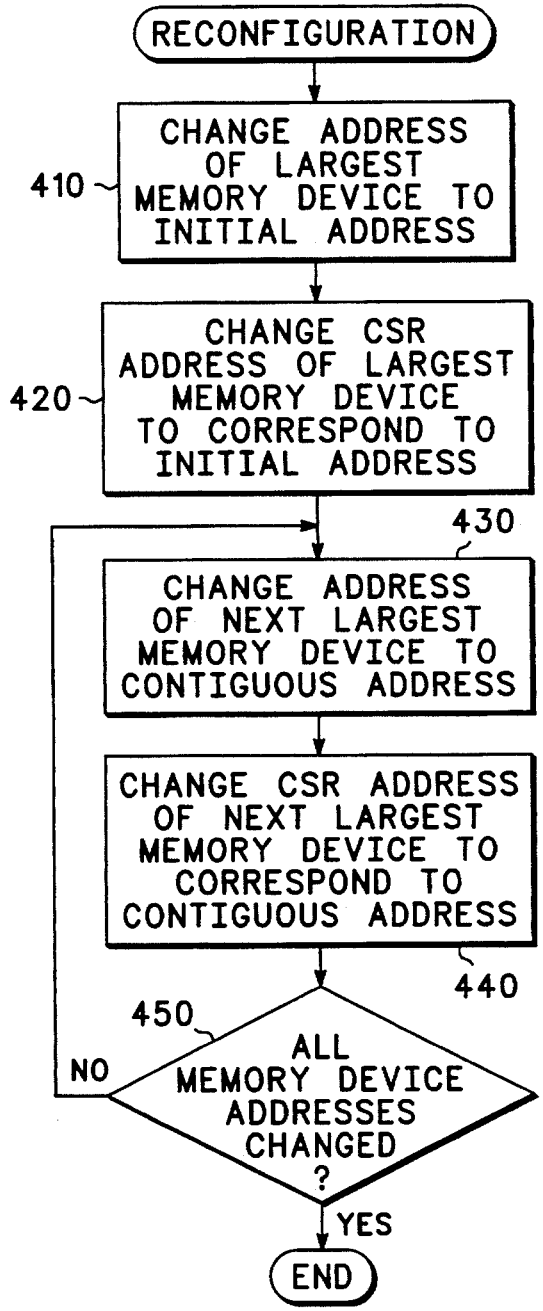
FIG. 4 is a flow diagram of the process of reconfiguration performed by a preferred embodiment of the present invention.

FIG. 4 is a flow diagram of the process of reconfiguration performed by the preferred embodiment of the present invention. The reconfiguration process of FIG. 4 reconfigures the memory devices 200 based on size, giving the largest memory device 200 the initial address and addressing the rest of the memory devices contiguously in order of decreasing size. In step 410, the CPU 102 changes the address of the largest memory device 200 back to the initial address 0. In step 420, the CPU 102 changes the address of the CSR 220 in the memory system 104 having the largest memory device 200 back to the initial CSR address FFE01000h.

Then, in step 430, the CPU 102 changes the address of the next largest memory device 200 to an address contiguous to the memory device 200 having the last changed address. In step 440, the CPU 102 changes the address of the CSR 220 in the memory system 104 having the next largest memory device 200 to an address corresponding to the newly changed address of the next largest memory device 200 (e.g., offsetting the initial CSR 220 address FFE01000h by a same amount as the newly changed address of the next largest memory device 200 offsets the last changed address). In step 450, the CPU 102 determines whether the addresses of all the memory devices 200 have been changed. If not, the CPU 102 loops back to step 430, and the CPU 102 continues to change the address of the next largest memory device 200 in step 430 and the CSR address of the next largest memory device 200 in step 440. When the CPU 102 determines in step 450 that the address of all memory devices 200 have been changed, reconfiguration is complete.

Figure 5:
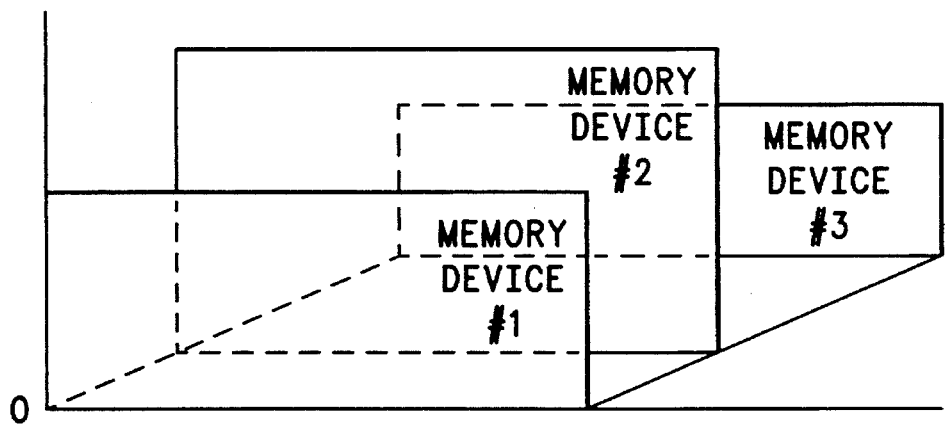
FIG. 5 is an illustration of memory device addresses prior to the initial configuration process of FIG. 3.
Figure 6:
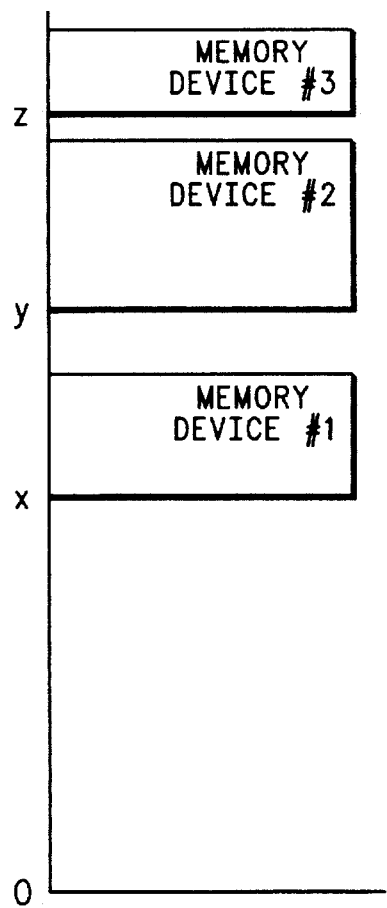
FIG. 6 is an illustration of memory device addresses after completion the initial configuration process of FIG. 3.
Figure 7:
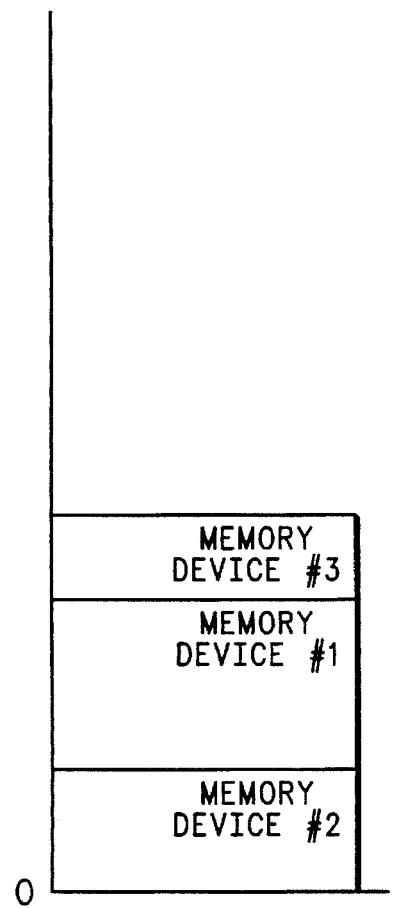
FIG. 7 is an illustration of memory device addresses after completion of the reconfiguration process of FIG. 4.

An example of the total configuration process of the preferred embodiment of the present invention, which includes both initial configuration and reconfiguration, is illustrated with respect to FIGS. 5, 6 and 7. FIGS. 5, 6 and 7 provide a symbolic representation of the addresses and sizes of three memory devices 200 (memory device #1, memory device #2 and memory device #3). FIG. 5 shows the addresses of the memory devices 200 prior to the initial configuration process of FIG. 3. Initially, all three memory devices 200 have the same initial address 0, as shown. FIG. 6 shows the addressees of the memory devices 200 after completion of the initial configuration process of FIG. 3. All three memory devices 200 have been moved to new, unique addresses x, y and z. No memory devices 200 now have address 0.

FIG. 7 shows the addresses of the memory devices 200 after completion of the reconfiguration process of FIG. 4. Assuming that the sizes of the memory devices 200 are memory device #2 size > memory device #1 size > memory device #3 size, the address of memory device #2, the largest memory device 200, is changed back to the initial address 0. The address of the next largest memory device 200, memory device #1, is then changed to 0 + memory device #2 size, which is the address contiguous to memory device #2, the memory device 200 having the last changed address. The address of the next largest and last memory device 200, memory device #3, is then changed to 0 + memory device #2 size + memory device #1 size, which is the address contiguous to memory device #1, the memory device 200 having the last changed address.

While specific embodiments of the invention have been shown and described, further modifications and improvements will occur to those skilled in the art. For example, the above described method of automatic configuration of memory devices may be applied to memory devices in same memory systems or on same boards, or enabled in different orders, as long as the basic concepts of enabling only a single memory device at a time and leaving all memory devices enabled for reconfiguration are embraced. It is understood that this invention is not limited to the particular forms shown and it is intended for the appended claims to cover all modifications of the invention which fall within the true spirit and scope of the invention.

What is claimed is:

1. A method for automatic configuration of memory devices in a computer system upon startup or reset of the computer system, the computer system comprising a processor and the memory devices, each of the memory devices having a same initial address through which the processor accesses the memory devices at startup or reset of the computer system, the method performed by the computer system and comprising the steps of:

(a) disabling all of the memory devices but one enabled memory device;

(b) changing the initial address of the enabled memory device to a new unique address;

(c) enabling, unless all of the memory devices have been enabled, a next one of the memory devices to produce a next enabled memory device;

(d) repeating steps (b) and (c) until the initial address of each of the memory devices has been changed; and (e) changing an address of one of the memory devices back to the initial address through which the processor accesses the one of the memory devices at startup or reset of the computer system.

2. The method of claim 1, wherein step (e) comprises changing an address of a largest memory device of the memory devices back to the initial address.

3. The method of claim 2, further comprising the steps of (f) changing an address of a next largest memory device of the memory devices to an address contiguous to a memory device having a last changed address; and (g) repeating step (f) until the address of each of the memory devices has been changed.

4. A method for automatic configuration of memory devices in a multiple board computer system upon startup or reset of the multiple board computer system, the multiple board computer system comprising a processor and the memory devices, each of the memory devices having a same initial address through which the processor accesses the memory devices at startup or reset of the computer system, the multiple board computer system having multiple boards comprising a motherboard including the processor and a memory system having one of the memory devices, and comprising one or more daughterboards connected to the motherboard by enable/disable lines in a daisy chain, each of the daughterboards including a different memory system having a different one of the memory devices, the method performed by the processor and comprising the steps of:

(a) disabling all of the enable/disable lines to disable all of the memory systems but one enabled memory system on the motherboard;

(b) changing the initial address of a memory device in the enabled memory system to a new unique address;

(c) enabling, unless all of the memory devices have been enabled, a next one of the enable/disable lines to one of the daughterboards to produce a next enabled memory system;

(d) repeating steps (b) and (c) until the initial address of each of the memory devices has been changed; and (e) changing an address of one of the memory devices back to the initial address through which the processor accesses the one of the memory devices at startup or reset of the computer system.

5. The method of claim 4, wherein step (e) comprises changing an address of a largest memory device of the memory devices back to the initial address.

6. The method of claim 5, further comprising the steps of:

(f) changing an address of a next largest memory device of the memory devices to an address contiguous to a memory device having a last changed address; and (g) repeating step (f) until the address of each of the memory devices has been changed.

7. A multiple board computer system comprising:

a motherboard having a processor and a memory system, the memory system having a memory device;

one or more daughterboards, each having a different memory system, the different memory system having a different memory device, each different memory device having an initial address through which the processor accesses the memory devices at startup or reset of the computer system, the daughterboards connected to the motherboard via enable/disable lines in a daisy chain; and the processor disabling, upon startup or reset of the multiple board computer system, all of the enable/disable lines to disable all the memory systems but one enabled memory system on the motherboard, changing the initial address of the memory device in the enabled memory system to a new unique address, enabling a next one of the enable/disable lines to one of the daughterboards to produce a next enabled memory system, continuing to change the initial address to a different new unique address and enable a different next memory system until the initial address of each memory device has been changed, and changing an address of one of the memory devices back to the initial address through which the processor accesses the one of the memory devices at startup or reset of the computer system.

8. The multiple board computer system of claim 7 wherein at least one memory device is a RAM.

9. The multiple board computer system of claim 7 wherein at least one memory device is a DRAM.

* * * * *